US012790257B2

(12) United States Patent
Hua et al.

(10) Patent No.: US 12,790,257 B2
(45) Date of Patent: Nov. 10, 2026

(54) METHOD AND DEVICE FOR PREPARING FLUORIDE GLASS OPTICAL FIBER PREFORM BY TUBE SUCTION METHOD

(71) Applicant: China Jiliang University, Hangzhou (CN)

(72) Inventors: Youjie Hua, Hangzhou (CN); Zhanhao Fan, Hangzhou (CN); Shiqing Xu, Hangzhou (CN); Muzhi Cai, Hangzhou (CN); Feifei Huang, Hangzhou (CN); Ying Tian, Hangzhou (CN); Junjie Zhang, Hangzhou (CN)

(73) Assignee: China Jiliang University, Hangzhou (CN)

( * ) Notice: Subject to any disclaimer, the term of this patent is extended or adjusted under 35 U.S.C. 154(b) by 62 days.

(21) Appl. No.: 18/926,791

(22) Filed: Oct. 25, 2024

(65) Prior Publication Data

US 2026/0062337 A1 Mar. 5, 2026

(30) Foreign Application Priority Data

Sep. 5, 2024 (CN) ........................ 202411247085.3

(51) Int. Cl.
*C03B 37/012* (2006.01)

(52) U.S. Cl.
CPC .. *C03B 37/01268* (2013.01); *C03B 37/01274* (2013.01); *C03B 2201/82* (2013.01)

(58) Field of Classification Search
None
See application file for complete search history.

(56) References Cited

U.S. PATENT DOCUMENTS

| | | | | |
|---|---|---|---|---|
| 4,519,826 | A * | 5/1985 | Tran | C03B 37/01268 385/124 |
| 4,925,475 | A * | 5/1990 | Mimura | C03B 37/01268 65/153 |
| 5,160,521 | A * | 11/1992 | Tran | C03B 37/01271 65/41 |
| 12,180,112 | B1 * | 12/2024 | Li | C03C 13/042 |
| 2024/0417305 | A1 * | 12/2024 | Vestel | C03B 37/01268 |

FOREIGN PATENT DOCUMENTS

| | | | | |
|---|---|---|---|---|
| CN | 105060700 A | | 11/2015 | |
| JP | H08133768 A | * | 5/1996 | C03B 37/01268 |

OTHER PUBLICATIONS

JPH08133768A Machine Translation by Clarivate Analytics retrieved Apr. 17, 2026. (Year: 2026).*

* cited by examiner

*Primary Examiner* — Lisa L Herring
(74) *Attorney, Agent, or Firm* — Pilloff Passino & Cosenza LLP; Rachel Pilloff; Sean Passino

(57) ABSTRACT

A method and a device for preparing a fluoride glass optical fiber preform by a tube suction method are provided. The method includes following steps: S1, heating and melting glass raw materials of outer cladding, inner cladding and a fiber core; S2, sucking to prepare the outer cladding; S3, sucking to prepare the inner cladding inside the outer cladding; S4, sucking to prepare the fiber core inside the inner cladding; and S5, annealing the outer cladding, the inner cladding and the fiber core to obtain a preform product.

4 Claims, 4 Drawing Sheets

METHOD AND DEVICE FOR PREPARING FLUORIDE GLASS OPTICAL FIBER PREFORM BY TUBE SUCTION METHOD

CROSS-REFERENCE TO RELATED APPLICATIONS

This application claims priority to Chinese Patent Application No. 202411247085.3, filed on Sep. 5, 2024, the contents of which are hereby incorporated by reference.

TECHNICAL FIELD

The present disclosure belongs to the technical field of optical fiber preform preparation, and in particular relates to a method and a device for preparing a fluoride glass optical fiber preform by a tube suction method.

BACKGROUND

Fluoride glass has the advantages of low phonon energy, excellent mid-infrared transmittance and high solubility of rare earth ions, and is an important precursor glass material for mid-infrared optical fibers. According to the different composition of fluoride glass optical fiber, there are three main types of fluoride zirconium glass optical fiber, indium fluoride glass optical fiber and aluminum fluoride glass optical fiber.

1. Zirconium fluoride glass optical fiber is mainly composed of $ZrF_4$, and the infrared absorption edge may reach 7 microns (μm), so zirconium fluoride glass optical fiber has high infrared transmittance. $ZrF_4$ itself may not form glass, but a stable glass body may be formed by adding $BaF_2$ as a glass network modifier, rare earth elements (La), alkali metal elements (such as Na) and a small amount of $AlF_3$ as glass stabilizers. The classical composition of zirconium fluoride glass optical fiber is: $53ZrF_4$-$20BaF_2$-$4LaF_3$-$3AlF_3$-20NaF, namely ZBLAN glass optical fiber. The results show that ZBLAN glass optical fiber has low phonon energy (550 per centimeter ($cm^{-1}$)), high rare earth solubility, high laser damage threshold, high fracture toughness and good chemical and thermal stability, and may be used as the gain medium of mid-infrared fiber laser after doped with rare earth.
2. Indium fluoride glass optical fiber is mainly composed of $InF_3$, and the composition is relatively complex, involving a variety of heavy metal fluorides and rare earth elements, may be formed into ternary, quaternary, five-membered, six-membered glass systems and glass systems with even more components, with large atomic reduced mass and weak bond strength to form glass. Therefore, indium fluoride glass optical fiber has the lowest phonon energy (510 $cm^{-1}$) among fluoride glass optical fibers at present, and has the infrared cut-off edge of >8 μm. However, due to the loose glass structure, indium fluoride glass is more susceptible to water erosion and crystallization than ZBLAN glass.
3. Aluminum fluoride glass optical fiber is mainly composed of $AlF_3$, and the classical component is AYF ($AlF_3$—$MgF_2$—$CaF_2$—$SrF_2$—$BaF_2$—$YF_3$), which has the characteristics of low phonon energy (630 $cm^{-1}$) and low refractive index, infrared cut-off edge up to 6 μm, high glass transition temperature and excellent chemical stability, far superior to ZBLAN glass. However, aluminum fluoride glass has shorter properties than ZBLAN glass and indium fluoride glass and is more prone to crystallization during preparation.

For fluoride glass optical fiber, loss is one of the most important key indexes. The quality of optical fiber preform plays an important role in the loss of optical fiber. The main factors affecting the quality of optical fiber preform are core-cladding interface, oxide impurity particles, fluoride microcrystals, bubbles, hydroxyl absorption, impurity metal ions and so on. Among them, oxide impurity particles are mainly $ZrO_2$, which comes from non-stoichiometric zirconium fluoride formed by $ZrF_4$ hydrate at high temperature. Fluoride microcrystals come from glass crystallization, which is mainly related to the composition of glass elements, molding process and impurity crystallization center. Hydroxyl absorption is due to the introduction of raw materials and water in the atmosphere in the steps of melting, casting and drawing optical fiber, leading to strong absorption at 2.7 μm. Impurity metal ions are mainly introduced through raw materials, and metal impurities with specific absorption peaks greatly increase the absorption loss of optical fibers. Due to the complex composition of fluoride glass, many influencing factors and the lack of corresponding gaseous compounds, the fluoride glass optical fiber preform may not be prepared by vapor deposition method like quartz optical fiber preform. At present, the main methods for preparing fluoride glass optical fiber are rod-in-tube method, suction injection method, rotary casting method and double crucible method.

The rod-in-tube method is a widely used method to make optical fiber preform. The main feature of this method is that the core rod and cladding glass tube are made separately by optical grinding and polishing, and the cladding glass tube and the core rod are sleeved together to form the optical fiber preform. The rod-in-tube method is easy to control the core-cladding diameter ratio, but requires extremely high optical processing quality of the inner surface of the cladding tube and the outer surface of the core rod. The tube-rod surface is susceptible to defects such as tiny scratches and pits, as well as being easily contaminated by impurity particles in the polishing material and the environment. In the optical fiber drawing process, there is an air gap between the inner surface of the cladding tube and the outer surface of the core rod, which may easily lead to problems of incomplete air removal and pollution by environmental impurities, resulting in high interface loss. In addition, due to the surface energy of the material, the glass is more likely to crystallize on the surface during softening, so the inner surface of the cladding tube and the outer surface of the core rod are also susceptible to crystallization during heating and softening. For fluoride glass optical fiber, this crystallization may be even more severe, resulting in large interface loss of the fiber.

The suction injection method is a method of making optical fiber preform by using the suction generated by the volume shrinkage of fluoride glass during cooling. When making a preform, the mold is assembled with the residual cavity for generating shrinkage suction, and the residual cavity and the mold need to be preheated in advance. The molten cladding glass melt is poured into the mold, and then the core glass melt is poured on the cladding glass melt. With the cooling of the glass melt, the volume of the glass melt in the mold and the residual cavity below shrinks. Due to the low temperature and high viscosity at the interface where the glass melt contacts the mold and the high temperature and low viscosity at the center, the process of the cladding glass melt flowing downward due to the volume shrinkage of the glass melt in the residual cavity mainly occurs in the center of the liquid column, so a core cladding structure may be formed. The biggest advantage of the suction injection method is that this method does not require the processing of the casing and core rod as in the rod-in-tube method, and thus does not suffer from the increased interface loss in the core cladding associated with the rod-in-tube method. Excellent interface quality of core cladding may be obtained by suction injection method. But the shortcomings of this method are also very obvious. Firstly, it is difficult to accurately grasp the timing and temperature of glass melt pouring, and the stability and consistency are poor. Secondly, the core material of suction injection usually presents a cone shape, so it is difficult to obtain a preform with uniform fiber core diameter. In addition, the pouring method adopted by suction injection method determines that it is difficult to produce high-quality glass optical fiber preform with excellent optical uniformity.

The rotary casting method is a method of making optical fiber preform by using centrifugal force generated by high-speed rotation of mold. Firstly, the cladding glass melt is poured into the mold and the mold starts to rotate at high speed. After the cladding glass solidifies, the mold is opened and the fiber core is poured to form the optical fiber preform. This method uses centrifugal force to make the glass melt evenly distributed and eliminate bubbles and inclusions, without additional processing, avoiding the problems of glass chipping caused by mechanical drilling required by the rod-in-tube method, and the inner wall of the cladding tube is smooth and does not cause external pollution. Cladding glass tubes with different outer and inner diameters may be conveniently prepared by changing the size of the mold or changing the volume of glass melt poured into the mold. However, the optical fiber preform made by rotary casting method is prone to more bubble defects at the fiber core-cladding interface.

China patent application NO. 201510478413.5 discloses a double crucible method for preparing optical fiber preform based on laminar flow effect. In this method, glass frit is melted by inner and outer double crucibles, and the leakage rate is controlled by the downward movement speed of the piston, and the Reynolds number of the leakage process is controlled by controlling the viscosity and leakage rate of the glass melt to ensure that the leakage process is laminar flow. The biggest advantage of this method is that it is different from the rod-in-tube method, which requires processing the casing and core rod, and also different from the suction injection method, which is difficult to obtain preforms with uniform fiber core diameter. The double crucible laminar leakage injection method may obtain excellent interface quality of core cladding and constant fiber core diameter. However, when fluoride glass melts, precipitates at the bottom of the crucible and bubbles with high adhesion will inevitably appear, which is caused by the high sensitivity of fluoride glass to air moisture and the non-stoichiometric zirconium fluoride formed by $ZrF_4$ hydrate at high temperature. Using the double crucible laminar leakage injection method, the precipitates and bubbles will be distributed inside the preform through laminar flow effect.

To sum up, in the existing preparation methods of fluoride glass optical fiber preform, the rod-in-tube method is difficult to process, has many defects on the inner and outer surfaces, and is susceptible to external environmental pollution. The stability and consistency of suction injection method are poor, and the fiber core shape is conical, so it is difficult to obtain preform with uniform fiber core diameter. The rotary casting method is prone to bubble defects at the core-cladding interface. The double crucible method is inevitably affected by the precipitates at the bottom of the crucible and the bubbles with high adhesion.

Therefore, it is necessary to design a method and a device for preparing a fluoride glass optical fiber preform by a tube suction method to solve the above problems.

SUMMARY

An objective of the present disclosure is to provide a method and a device for preparing a fluoride glass optical fiber preform by a tube suction method, so as to solve the above problems and achieve the objective of preparing a fluoride glass optical fiber preform with good fiber core-cladding interface quality, less crucible impurity pollution, uniform fiber core diameter and simple preparation process.

In order to achieve the above objectives, the present disclosure provides a following scheme: a method for preparing a fluoride glass optical fiber preform by a tube suction method, including following steps:

S1, heating and melting glass raw materials of outer cladding, inner cladding and a fiber core;

S2, sucking to prepare the outer cladding;

S3, sucking to prepare the inner cladding inside the outer cladding;

S4, sucking to prepare the fiber core inside the inner cladding; and

S5, annealing the outer cladding, the inner cladding and the fiber core to obtain a preform product.

In some embodiments, in the S1, the glass raw materials of the outer cladding, the inner cladding and the fiber core are respectively put into platinum crucibles, and the platinum crucibles are placed in a furnace at 700 to 900 degrees Celsius (° C.), and kept for 1 to 2 hours (h), so that the glass raw materials are completely melted.

In some embodiments, in the S2, a first platinum crucible containing an outer cladding melting raw material is taken out of the furnace and placed on a movable platform, and a temperature of the melting raw material is monitored by infrared temperature measurement; when the temperature of the melting raw material is reduced to 450-550° C., a quartz tube is inserted into the outer cladding melting raw material, and the melting raw material is sucked by a negative pressure, and a pressure is held for 5 to 30 seconds(s) after suction is completed, and the negative pressure is relieved, an excess raw material is discharged, and a preparation of the outer cladding is completed.

In some embodiments, in the S3, a second platinum crucible containing an inner cladding melting raw material is moved below the quartz tube through the movable platform, the quartz tube with the outer cladding is inserted into the inner cladding melting raw material, the melting raw material is sucked by the negative pressure, the pressure is held for 5 s to 10 s after suction is completed, the negative pressure is relieved, an excess raw material is discharged, and a preparation of the inner cladding is completed.

In some embodiments, in the S4, a third platinum crucible containing a fiber core melting raw material is moved below the quartz tube through the movable platform, and the quartz tube with the outer cladding and the inner cladding is inserted into the fiber core melting raw material, and the melting raw material is sucked by the negative pressure, and the pressure is held for 10 s to 30 s after suction is completed, and the negative pressure is relieved after the fiber core melting raw material is solidified.

In some embodiments, in the S5, the quartz tube with the outer cladding, the inner cladding and the fiber core is put into an annealing furnace for annealing, where an annealing temperature is 10 to 20° C. higher than a glass transition temperature, and a duration of an annealing heat preservation is 2 h to 4 h; after the heat preservation is completed, a temperature of the quartz tube is cooled to room temperature at a rate of 10 degrees Celsius per hour (° C./h), and the preform product is obtained.

In some embodiments, a preform product with a single cladding may also be prepared.

A device used in the method for preparing the fluoride glass optical fiber preform by the tube suction method is further provided, which includes a movable platform. Platinum crucibles are placed on a top end of the movable platform, and a lifting column is arranged on one side of the movable platform, and the lifting column is fixedly connected to a valve body through a bracket. The valve body is fixedly in communication with a quartz tube, and the quartz tube is located above the platinum crucibles. The valve body is also fixedly in communication with two hoses, one of the hoses is fixedly in communication with a sucker, and an other of the hoses is fixedly in communication with a vent valve through a quick-connect port.

Compared with the prior art, the present disclosure has following advantages and technical effects.

Good quality of the fiber core-cladding interface: the inner wall of the prepared cladding tube is a surface naturally formed by glass melt, and there are no defects and pollution caused by optical processing. In addition, the fiber core is smoothly sucked from bottom to top, and the optical processing of the core rod is not needed, so that the core-cladding interface with excellent quality may be obtained, and the negative influence of defects, pollution, crystallization and other factors existing on the core-cladding interface in the rod-in-tube method on optical fiber drawing may be avoided, and the optical fiber interface loss may be greatly reduced.

Less impurity pollution: when fluoride glass is melted, the raw materials are volatile, and a large amount of particulate impurities are often attached to the inner wall of the crucible. If the glass melt is directly poured out of the crucible, it will inevitably cause pollution to the glass melt. In the operation process according to the present disclosure, the quartz glass tube is directly inserted into the cladding or fiber core glass melt, and the glass melt in the crucible is taken, so that the pollution of the glass melt by impurities on the inner wall of the crucible may be completely avoided, and the impurity scattering loss of the optical fiber may be reduced.

Uniform fiber core diameter: although the suction injection method may also obtain a good core-cladding interface, the fiber core shape obtained by the suction injection method presents a conical structure, so it is impossible to obtain a long optical fiber with uniform fiber core diameter, and the optical fiber preform obtained by the present disclosure has good fiber core diameter uniformity.

Simple preparation process: because the thermal expansion coefficients of fluoride glass and quartz are quite different, the preform and quartz tube will shrink in different degrees after cooling, so that the preform and the inner wall of quartz tube are naturally separated, and the outer surface of the obtained preform is smooth and clean without polishing, so the overall preparation process is simple.

BRIEF DESCRIPTION OF THE DRAWINGS

In order to explain the embodiments of the present disclosure or the technical scheme in the prior art more clearly, the drawings needed in the embodiments will be briefly introduced below. Obviously, the drawings in the following description are only some embodiments of the present disclosure. For one of ordinary skill in the art, other drawings may be obtained according to these drawings without creative effort.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Figure 1:
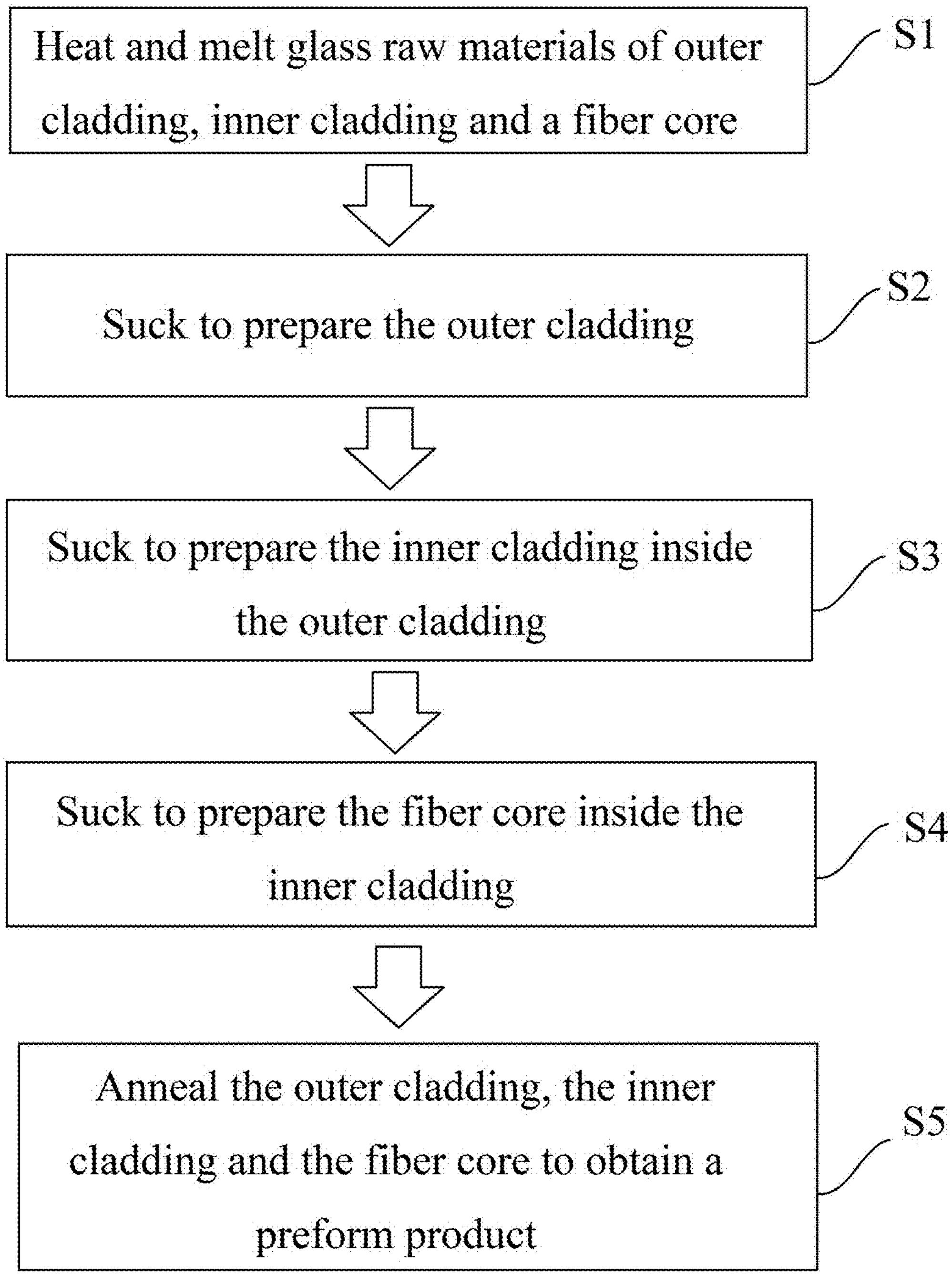
FIG. 1 is a flow chart of a method for preparing a fluoride glass optical fiber preform by a tube suction method according to the present disclosure.
Figure 2:
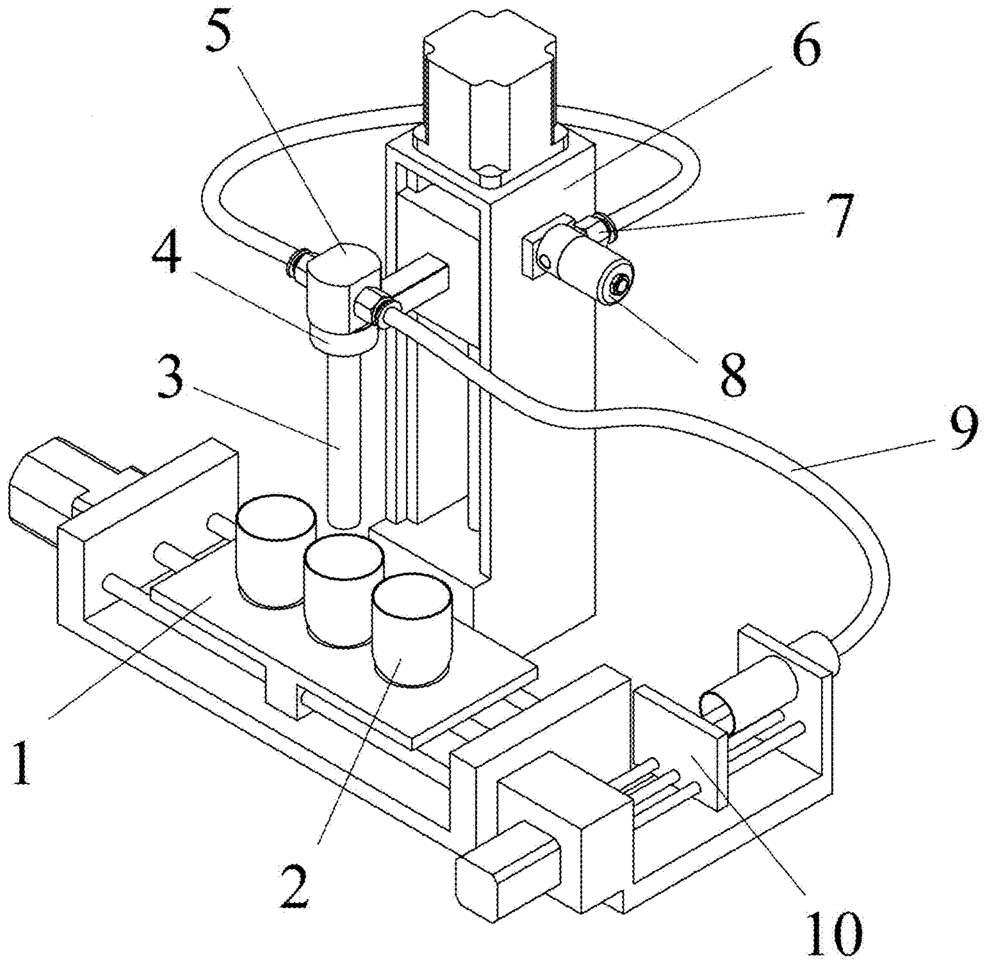
FIG. 2 is a schematic structural diagram of a device according to the present disclosure.
Figure 3:
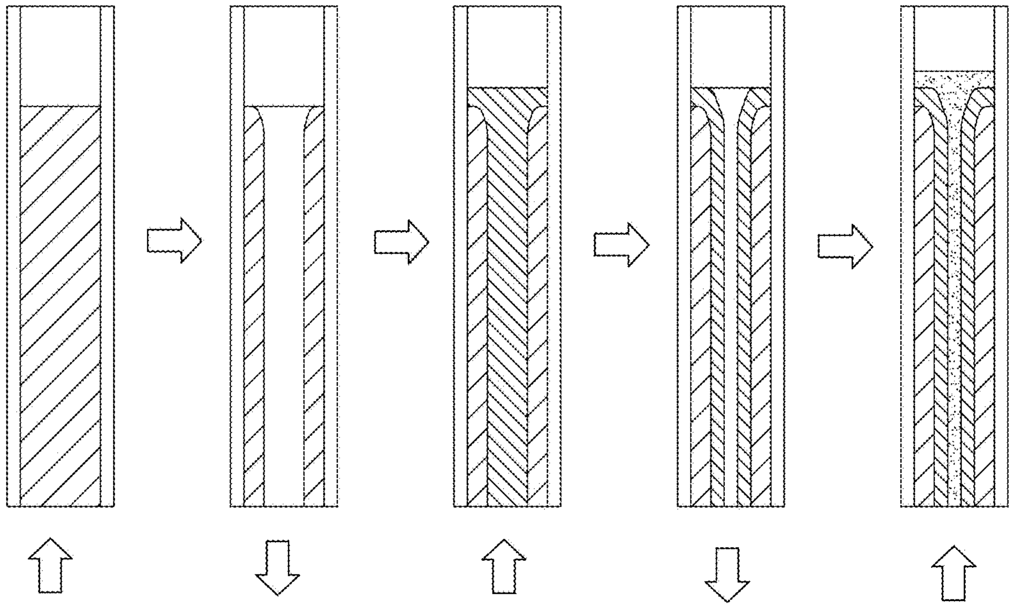
FIG. 3 is a flow chart for preparing a double cladding preform according to the present disclosure.
Figure 4:
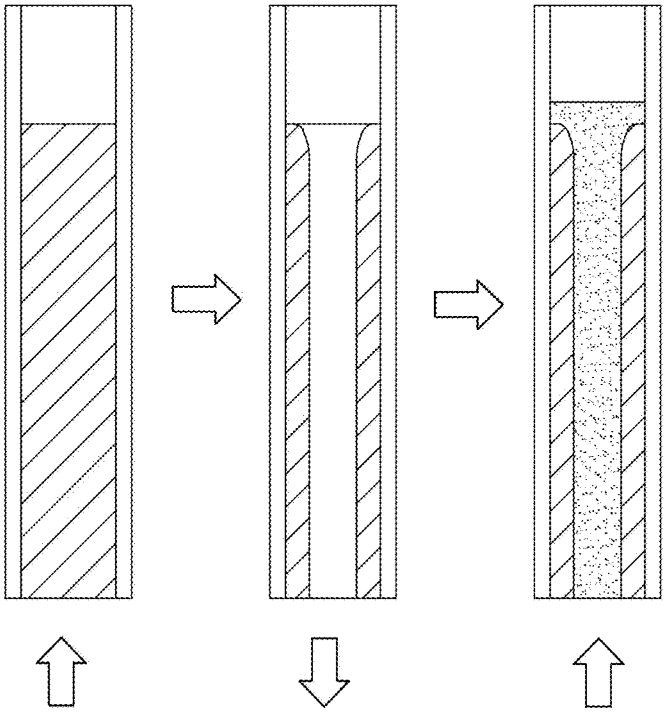
FIG. 4 is a flow chart for preparing a single cladding preform according to the present disclosure.

With reference to FIG. 1 to FIG. 4, the present disclosure provides a method for preparing a fluoride glass optical fiber preform by a tube suction method, which includes the following steps.

- S1, glass raw materials of outer cladding, inner cladding and a fiber core are heated and melted;
- S2, the glass raw material in a first platinum crucible is sucked to prepare the outer cladding;
- S3, the glass raw material in a second platinum crucible is sucked to prepare the inner cladding inside the outer cladding;
- S4, the glass raw material in a third platinum crucible is sucked to prepare the fiber core inside the inner cladding; and
- S5, the outer cladding, the inner cladding and the fiber core are annealed to obtain a preform product.

In an embodiment, in the S1, the glass raw materials of the outer cladding, the inner cladding and the fiber core are respectively put into platinum crucibles 2 (i.e., the first, second and third platinum crucibles), and the platinum crucibles 2 are placed in a furnace at 700-900° C. and kept for 1-2 h, so that the glass raw materials are completely melted.

In an embodiment, in the S2, the first of the platinum crucibles 2 containing an outer cladding melting raw material is taken out of the furnace and placed on a movable platform 1, and the temperature of the melting raw material is monitored by infrared temperature measurement. When the temperature of the melting raw material is reduced to 450°-550° C., a quartz tube 3 is inserted into the outer cladding melting raw material, and the melting raw material is sucked by a negative pressure, and a pressure is held for 5-30 s after the suction is completed, and the negative pressure is relieved and an excess raw material is discharged, a preparation of the outer cladding is completed.

The quartz tube 3 is a mold for preparing preforms, and preforms of different sizes may be prepared by the quartz tubes with different diameters and lengths.

In an embodiment, in the S3, the second platinum crucible 2 containing an inner cladding melting raw material is moved below the quartz tube 3 through the movable platform 1, the quartz tube 3 with the outer cladding is inserted into the inner cladding melting raw material, the melting raw material is sucked by the negative pressure, the pressure is held for 5-10 s after the suction is completed, the negative pressure is relieved, and an excess raw material is discharged, and a preparation of the inner cladding is completed.

In an embodiment, in the S4, the third platinum crucibles 2 containing a fiber core melting raw material is moved below the quartz tube 3 through the movable platform 1, and the quartz tube 3 with the outer cladding and the inner cladding is inserted into the fiber core melting raw material, and the melting raw material is sucked by the negative pressure, and the pressure is held for 10-30 s after the suction is completed, and the negative pressure is relieved after the fiber core raw melting material is solidified.

The thickness of the cladding glass is controlled by controlling the pressure-holding duration after sucking the melting raw materials.

In an embodiment, in the S5, the quartz tube 3 with the outer cladding, the inner cladding and the fiber core is put into an annealing furnace for annealing. An annealing temperature is 10-20° C. higher than a glass transition temperature, and the duration of the annealing heat preservation is 2-4 h; after heat preservation is completed, the temperature is cooled to room temperature at a rate of 10° C./h, and the preform product is obtained.

In an embodiment, a preform product with a single cladding may also be prepared.

When preparing the single cladding preform, one molten fiber core material and only one molten cladding material need to be prepared. Meanwhile, the S3 is omitted, and the S4 is changed to be: the glass raw material in the platinum crucible is sucked to prepare the fiber core inside the outer cladding, and the S5 is changed to be: the outer cladding and the fiber core are annealed to obtain the single cladding preform product.

The number of platinum crucibles 2 is three or two. When the number of platinum crucibles 2 is three, the three platinum crucibles 2 are used to prepare double cladding preforms. And when the number of platinum crucibles 2 is two, the two platinum crucibles 2 are used to prepare single cladding preforms. Different platinum crucibles 2 are used to hold different fiber cores and cladding raw material melts.

A device used in the method for preparing the fluoride glass optical fiber preform by the tube suction method is provided, which includes a movable platform 1. The platinum crucibles 2 are placed on the top end of the movable platform 1, and a lifting column 6 is arranged on one side of the movable platform 1, and the lifting column 6 is fixedly connected to a valve body 5 through a bracket 4, and the valve body 5 is fixedly communicated with a quartz tube 3, and the quartz tube 3 is located above the platinum crucibles 2, and the valve body 5 is also fixedly communicated with two hoses 9. One of the hoses 9 is fixedly communicated with a sucker 10, and the other of the hoses 9 is fixedly communicated with a vent valve 8 through a quick-connect port 7.

The movable platform 1 has a program-controlled mobile function, which is capable of driving the placed platinum crucibles 2 to move. The quartz tube 3 is assembled on the valve body 5 and sealed by an O-ring. The bracket 4 is installed on the lifting column 6, and the lifting column 6 has a program-controlled lifting function and is capable of driving the valve body 5 and the quartz tube 3 to move up and down, and extend into the platinum crucibles 2. The vent valve 8 and the sucker 10 are respectively connected to the valve body 5 by the quick-connect port 7 and the hoses 9.

The vent valve 8 has a program-controlled function, and the negative pressure in the quartz tube 3 is maintained or relieved through program control.

The sucker 10 has a program-controlled function. The program-controlled suction or discharge of glass melt may be realized by moving the piston to generate a negative pressure.

A manufacturing process according to the present disclosure includes following steps. A high-temperature furnace is turned on, and cladding and fiber core glass are melted respectively in multiple platinum crucibles 2. The fiber core and cladding glass melt are placed on the movable platform 1 for temperature monitoring after being melted. When the temperature is appropriate, the glass melt is sucked into the quartz tube 3 to form the preform. The suction temperature is determined by the viscosity of the glass melt, and the cladding thickness is controlled by the pressure-holding duration. By controlling the viscosity of the glass melt and heat preservation duration, the cladding thickness is controlled. The number of cladding layers is controlled by the number of times of suction. After the annealing is completed, the quartz tube 3 is taken out to obtain the required optical fiber preform.

The negative pressure generated by the piston movement of the sucker 10 sucks the glass melt, and after the glass melt is cooled to a certain degree, the excess glass melt is discharged to form a cladding tube. In this process, the required cladding thickness may be prepared by controlling the temperature of the glass melt and the pressure-holding duration after suction. A bubble-free interface between cladding and fiber core is achieved by the good wettability of glass surface at high temperature. In addition, the preform may be automatically demoulded by the thermal expansion difference between the quartz tube 3 and fluoride glass.

Embodiment 1: A Zirconium Fluoride-Based Double Cladding Fluoride Glass Optical Fiber Preform 1, glasses of zirconium fluoride-based outer cladding, inner cladding and fiber core are put into two 100 ml and one 75 ml platinum crucibles 2 respectively, and the platinum crucibles 2 are put into a silicon-carbon rod furnace and melted for 1 hour at 700° C. to completely melt glass raw materials into a liquid state, and then the glass raw materials are stirred with a platinum paddle for 30 minutes at a stirring speed of 60 revolutions per minute (rpm) to keep glass melts in the platinum crucibles 2 at 700° C. for later use.

2, a quartz tube 3 with an inner diameter of 15 centimetres (cm) and a length of 20 cm is selected according to a size of a target optical fiber, and the quartz tube 3 is inserted into a tenon of the valve body 5 to complete the fixation of the quartz tube 3.

3, the glass melts of the outer cladding, inner cladding and fiber core are taken out successively at intervals of 1 minute and 30 seconds respectively and put on the movable platform 1, and the temperature of the glass melts is monitored by infrared temperature measurement; after the temperature of the outer cladding glass melt drops to 480° C., the program is started, and the quartz tube 3 is inserted into the outer cladding glass melt, and the glass melt is sucked until the liquid level is slightly higher than the required length of the preform.

4, after the suction is completed, the quartz tube 3 is lifted out of the liquid level, the pressure is held for 30 seconds, the negative pressure is relieved, and the excess glass melt is discharged, and the preparation of the outer cladding is completed.

5, the program is executed to align the quartz tube 3 with the inner cladding glass melt, the quartz tube 3 with the outer cladding tube is inserted into the inner cladding glass melt, and the inner cladding glass melt is sucked until the liquid level is slightly higher than the length of the outer cladding.

6, the quartz tube 3 is lifted out of the liquid level after the suction is completed, the pressure is held for 10 seconds after the suction is completed, the negative pressure is relieved, and the excess glass melt is discharged, and the preparation of the inner cladding is completed.

7, the program is executed to align the quartz tube 3 with the fiber core glass melt, the quartz tube 3 with the cladding tube is inserted into the fiber core glass melt, and the fiber core glass melt is sucked until the liquid level is slightly higher than the length of the inner cladding.

8, the quartz tube 3 is lifted out of the liquid level after the suction is completed, and the pressure is held for 30 seconds. After the fiber core glass melt is solidified, the negative pressure is relieved, and the quartz tube 3 is removed and immediately put into a precision annealing furnace for annealing. The initial annealing temperature is set at 250° C., and then heat preservation is performed at this temperature for 3 hours, and then the temperature is cooled to room temperature at a rate of 10° C./h.

9, after the annealing is completed, the fluoride glass rod is taken out from the quartz tube 3 to obtain the zirconium fluoride-based glass optical fiber preform with a double cladding structure.

Embodiment 2: A Zirconium Fluoride-Based Single Cladding Fluoride Glass Optical Fiber Preform 1, glasses of zirconium fluoride-based outer cladding and fiber core are put into two 100 ml platinum crucibles 2, respectively, the platinum crucibles 2 are put into the silicon-carbon rod furnace and melted for 1 hour at 700° C. to completely melt the glass raw materials into a liquid state, and then the glass raw materials are stirred with a platinum paddle for 30 minutes at a stirring speed of 60 rpm to keep the glass melts in the platinum crucibles 2 at 700° C. for later use.

2, a quartz tube 3 with an inner diameter of 10 cm and a length of 20 cm is selected according to a size of a target optical fiber, and the quartz tube 3 is inserted into the tenon of the valve body 5 to complete the fixation of the quartz tube 3.

3, the glass melts of the outer cladding and fiber core are taken out after an interval of 1 minute and put on the movable platform 1, and the temperature of the glass melts is monitored by infrared temperature measurement; after the temperature of the outer cladding glass melt drops to 450° C., the program is started, and the quartz tube 3 is inserted into the outer cladding glass melt, and the glass melt is sucked until the liquid level is slightly higher than the required preform length.

4, after the suction is completed, the quartz tube 3 is lifted out of the liquid level, the pressure is held for 10 seconds, the negative pressure is relieved, and the excess glass melt is discharged, and the preparation of the outer cladding is completed.

5, the program is executed to align the quartz tube 3 with the fiber core glass melt, the quartz tube 3 with the cladding tube is inserted into the fiber core glass melt, and the fiber core glass melt is sucked until the liquid level is slightly higher than the length of the outer cladding.

6, the quartz tube 3 is lifted out of the liquid level after the suction is completed, and the pressure is held for 10 seconds. After the fiber core glass melt is solidified, the negative pressure is relieved, and the quartz tube 3 is removed and immediately put into a precision annealing furnace for annealing. The initial annealing temperature is set at 250° C., and then heat preservation is performed at this temperature for 2 hours, and then the temperature is cooled to room temperature at a rate of 10° C./h.

7, after the annealing is completed, the fluoride glass rod is taken out from the quartz tube 3 to obtain the zirconium fluoride-based glass optical fiber preform with a single cladding structure.

Embodiment 3: An Indium Fluoride-Based Double Cladding Fluoride Glass Optical Fiber Preform 1, glasses of the indium fluoride-based outer cladding, inner cladding and fiber core are put into two 100 ml and one 75 ml platinum crucibles 2 respectively, the platinum crucibles 2 are put into a silicon-carbon rod furnace and melted for 1 hour at 900° C. to completely melt the glass raw materials into a liquid state, and then the glass raw materials are stirred with a platinum paddle for 30 minutes at a stirring speed of 60 rpm to keep the glass melts in the platinum crucibles 2 at 800° C. for later use.

2, a quartz tube 3 with an inner diameter of 12 cm and a length of 20 cm is selected according to a size of a target optical fiber, and the quartz tube 3 is inserted into the tenon of the valve body 5 to complete the fixation of the quartz tube 3.

3, the glass melts of the outer cladding, inner cladding and fiber core are taken out successively at intervals of 1.5 minutes and 30 seconds respectively and put on the movable platform 1, the temperature of the glass melts is monitored by infrared temperature measurement; after the temperature of the outer cladding glass melt drops to 550° C., the program is started, the quartz tube 3 is inserted into the outer cladding glass melt, and the glass melt is sucked until the liquid level is slightly higher than the required preform length.

4, after the suction is completed, the quartz tube 3 is lifted out of the liquid level for 30 seconds, the negative pressure is relieved, and excess glass melt is discharged, and the preparation of the outer cladding is completed.

5, the program is executed to align the quartz tube 3 with the inner cladding glass melt, the quartz tube 3 with the outer cladding tube is inserted into the inner cladding glass melt, and the inner cladding glass melt is sucked until the liquid level is slightly higher than the length of the outer cladding.

6, the quartz tube 3 is lifted out of the liquid level after the suction is completed, the pressure is held for 5 seconds after the suction is completed, the negative pressure is relieved, and the excess glass melt is discharged, and the preparation of the inner cladding is completed.

7, the program is executed to align the quartz tube 3 with the fiber core glass melt, the quartz tube 3 with the cladding tube is inserted into the fiber core glass melt, and the fiber core glass melt is sucked until the liquid level is slightly higher than the length of the inner cladding.

8, the quartz tube 3 is lifted out of the liquid level after the suction is completed, and the pressure is held for 30 seconds. After the fiber core glass melt is solidified, the negative pressure is relieved, and the quartz tube 3 is taken down and immediately put into a precision annealing furnace for annealing. The initial annealing temperature is set at 230° C., and then heat preservation is performed at this temperature for 4 hours, and then the temperature is cooled to room temperature at a rate of 10° C./h.

9, after the annealing is completed, the fluoride glass rod is taken out from the quartz tube 3 to obtain the indium fluoride-based glass optical fiber preform with a double cladding structure.

In the description of the present disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the present disclosure, and do not indicate or imply that the device or element referred to must have a specific orientation, be constructed and operated in a specific orientation, and therefore cannot be understood as a limitation of the present disclosure.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical scheme of the present disclosure should fall within the protection scope of the present disclosure.

What is claimed is:

1. A method for preparing a glass optical fiber preform by a tube suction method, comprising following steps:

S1, heating and melting glass raw materials of outer cladding, inner cladding and a fiber core;

S2, sucking to prepare the outer cladding;

S3, sucking to prepare the inner cladding inside the outer cladding;

S4, sucking to prepare the fiber core inside the inner cladding; and

S5, annealing the outer cladding, the inner cladding and the fiber core to obtain a preform product;

wherein in the S1, the glass raw materials of the outer cladding, the inner cladding and the fiber core are respectively put into platinum crucibles, and the platinum crucibles are placed in a furnace at 700-900 degrees Celsius and kept for 1-2 hours, so that the glass raw materials are completely melted; and in the S2, a first platinum crucible containing an outer cladding melting raw material is taken out of the furnace and placed on a movable platform, and a temperature of the outer cladding melting raw material is monitored by infrared temperature measurement; when the temperature of the outer cladding melting raw material is reduced to 450-550 degrees Celsius, a quartz tube is inserted into the outer cladding melting raw material, and the outer cladding melting raw material is sucked by a negative pressure, and a pressure is held for 5-30 seconds after suction is completed, and the negative pressure is relieved, an excess outer cladding melting raw material is discharged, and a preparation of the outer cladding is completed.

2. The method of claim 1, wherein in the S3, a second platinum crucible containing an inner cladding melting raw material is moved below the quartz tube through the movable platform, the quartz tube with the outer cladding is inserted into the inner cladding melting raw material, the inner cladding melting raw material is sucked by the negative pressure, the pressure is held for 5-10 seconds after suction is completed, the negative pressure is relieved, an excess inner cladding melting raw material is discharged, and a preparation of the inner cladding is completed.

3. The method of claim 2, wherein in the S4, a third platinum crucible containing a fiber core melting raw material is moved below the quartz tube through the movable platform, and the quartz tube with the outer cladding and the inner cladding is inserted into the fiber core melting raw material, and the fiber core melting raw material is sucked by the negative pressure, and the pressure is held for 10-30 seconds after suction is completed, and the negative pressure is relieved after the fiber core melting raw material is solidified.

4. The method of claim 3, wherein in the S5, the quartz tube with the outer cladding, the inner cladding and the fiber core is put into an annealing furnace for annealing, wherein an annealing temperature is 10-20 degrees Celsius higher than a glass transition temperature, and a duration of an annealing heat preservation is 2-4 hours; and after the heat preservation is completed, a temperature of the quartz tube is cooled to room temperature at a rate of 10 degrees Celsius per hour, and the preform product is obtained.

* * * * *